US011326642B2

United States Patent
Wu et al.

(10) Patent No.: US 11,326,642 B2
(45) Date of Patent: May 10, 2022

(54) AIR SUSPENSION SUPPORT AND MOTION GUIDING DEVICE HAVING UNEQUAL-DEPTH THROTTLING CHAMBERS

(71) Applicant: Harbin Institute of Technology, Harbin (CN)

(72) Inventors: JianWei Wu, Harbin (CN); ZhongPu Wen, Harbin (CN); PengCheng Hu, Harbin (CN); JiWen Cui, Harbin (CN); JiuBin Tan, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 16/973,598

(22) PCT Filed: Nov. 12, 2018

(86) PCT No.: PCT/CN2018/114971
§ 371 (c)(1),
(2) Date: Dec. 9, 2020

(87) PCT Pub. No.: WO2019/214198
PCT Pub. Date: Nov. 14, 2019

(65) Prior Publication Data
US 2021/0246946 A1    Aug. 12, 2021

(30) Foreign Application Priority Data

May 9, 2018  (CN) .......................... 201810436968.7

(51) Int. Cl.
*F16C 32/06* (2006.01)
*F16C 29/02* (2006.01)

(52) U.S. Cl.
CPC ........ *F16C 32/0614* (2013.01); *F16C 29/025* (2013.01)

(58) Field of Classification Search
CPC .... F16C 29/025; F16C 32/06; F16C 32/0603; F16C 32/0614; F16C 32/0622; F16C 32/0625
See application file for complete search history.

(56) References Cited

U.S. PATENT DOCUMENTS 8,608,382 B2 * 12/2013 Uchimura .......... F16C 32/0614
                                                    384/12
10,288,063 B2 *  5/2019 Muhle ................. F16C 32/0603

FOREIGN PATENT DOCUMENTS

JP            5082929       * 11/2012

* cited by examiner

*Primary Examiner* — James Pilkington
(74) *Attorney, Agent, or Firm* — IPro, PLLC

(57) ABSTRACT

An air suspension support and motion guiding device having unequal-depth throttling chambers. Throttling plugs (10) are arranged regularly on an air suspension working surface, forming an array of throttling chambers with unequal depths. The invention improves the rotational stiffness per unit area for an air suspension working surface while ensuring support and stability of an air-suspended rail (1) and enables construction of a small-volume, long cantilever, high torque load two-dimensional motion reference device.

2 Claims, 5 Drawing Sheets

AIR SUSPENSION SUPPORT AND MOTION GUIDING DEVICE HAVING UNEQUAL-DEPTH THROTTLING CHAMBERS

CROSS-REFERENCE TO RELATED APPLICATIONS

This application is a U.S. National Phase application of International Application No. PCT/CN2018/114971, filed on Nov. 12, 2018, which claims priority to Chinese Patent Application No. 201810436968.7, filed on May 9, 2018.

TECHNICAL FIELD

The invention belongs to the technical fields of precision instrument and machinery, and particularly relates to an air suspension support and motion guiding device having unequal-depth throttling chambers.

BACKGROUND

In recent years, as the advanced chip manufacturing industry gradually develops towards functional integration and volume miniaturization, the aerostatic linear motion reference device has become one of the key components in the cutting-edge lithography machine because of its remarkable advantages such as high speed and high precision. The high speed, high acceleration, and high motion precision of the diaphragm in the exposure system of the lithography machine require high support capacity and high rotational stiffness of the aerostatic rail in the aerostatic linear motion reference device. In order to prevent the linear motion mechanism from blocking the optical path or touching optics, the diaphragm is disposed at the cantilever end of the linear motion reference device, so it is necessary to improve the rotational stiffness of the aerostatic rail to resist the rotational torque generated when the diaphragm moves at high acceleration. However, the exposure system of the lithography machine is complex and precise, and its aerostatic linear motion mechanism needs to be miniaturized. Therefore, how to improve the rotational stiffness per unit area becomes a major technical problem that restricts the application of the aerostatic rail in the exposure system of the lithography machine.

In 2008, the Twinscan XT 1950i type lithography machine developed by ASML in the Netherlands can achieve laser etching of 38-nm chips. The linear motion reference device in its exposure system adopts a mechanical rail structure and achieves an acceleration motion of 40 m/s$^2$ (Y. B. Patrick Kwan, Erik L. Loopstra. Nullifying Acceleration Forces in Nano-Positioning Stages for Sub-0.1 mm Lithography Tool for 300 mm Wafers [J]. proceeding of SPIC: Optical Microlithography, 2010, 4346: 544-557). However, with the development of the chip manufacturing industry, traditional sliding/rolling rails are difficult to meet the requirements of high acceleration motion and working temperature stability.

Patent CN201220540610 "Two-dimensional frictionless long-distance motion multi-layer air suspension hanging device" proposes an air-suspension-oriented hanging type motion device, which mainly includes a single-layer hanging device and an unfolding experiment rack. The single-layer hanging device includes a support part, an air suspension follow-up part, a detection part and a rail system. The air suspension follow-up part includes a longitudinal air suspension sleeve, two horizontal air suspension sleeves, two air suspension seats, a telescopic air pipe, a horizontal air suspension shaft and hanging tooling. This device can achieve large-displacement and long-distance follow-up motion, and meet cooperated motion between multi-layer hanging devices. However, this device is a follow-up motion device, which cannot guarantee the motion accuracy; and moreover, this device needs to be disposed on the unfolding experiment rack for use, and the structure is not compact enough.

Patent CN201310436356 "Air suspension hanging type three-dimensional unfolding experiment device" proposes a three-dimensional motion device with high positioning accuracy and fast response speed, which mainly includes a dozen air suspension motion mechanisms that are spatially correspondingly distributed, and disposed inside a support frame with the help of mechanisms such as pulleys, slings, and counterweights. This device can meet certain motion accuracy. However, due to a large number of motion links, the output end cannot ensure fast and accurate displacement response in the high-frequency motion state, and the structure is not compact enough.

Patent CN201410839808 "Grating ruling tool rest driving device with two air-suspended rails" proposes a small one-dimensional motion device, which mainly includes two sets of air-suspended rails disposed in parallel, and the motion stability of the ruling tool rest is improved by being fixed to air suspension sliding sleeves. This device can achieve high speed and high frequency motion. However, compared with the displacement output end of this device, such as the tool rest adapter plate and the ruling tool rest, the air-suspended rails are too large, so the rotational stiffness per unit area is poor, and a tool rest counterweight is required to maintain balance.

Patent CN201610130635 "Double-sided air suspension transport platform" and patent CN201710832517 "Motion platform based on H-type air-suspended rails" respectively propose air suspension devices that realize two-dimensional motion, which can achieve higher motion and positioning accuracy while taking stability into account. However, the use methods of the two devices are both of mount type, which cannot be used in suspended or cantilevered motion occasions, and the volume is too large for the exposure system of the lithography machine.

The common feature of the above-mentioned inventions is that the small air-suspended rails cannot be applied to high speed, high acceleration, and high frequency motion occasions. However, in the exposure system of the lithography machine, the high-speed and high-precision motion of the diaphragm is achieved by air suspension support and motion guiding, so the support and rotational stiffness of the linear air-suspended rail per unit area needs to be improved, and thereby the reliability and accuracy of the cantilever linear motion reference device are improved.

SUMMARY

An objective of the invention is to solve the above-mentioned problems in the prior art, and propose an air suspension support and motion guiding device having unequal-depth throttling chambers. Throttling plugs are arranged regularly on an air suspension working surface, forming an array of throttling chambers with unequal-depths. The invention improves the rotational stiffness per unit area for an air suspension working surface while ensuring support and stability of an air-suspended rail. By combining accurate driving and feedback control, the invention achieves high speed, high acceleration, high frequency motion.

The above objective is achieved through the following technical solution:

An air suspension support and motion guiding device having unequal-depth throttling chambers includes an air-suspended rail, a U-shaped air suspension bottom plate, an air-sealing screw, an air suspension cover plate, a load unit and a rail base. Three air suspension working surfaces B, D, and H are provided on the inside of the U-shaped air suspension bottom plate, and a plurality of unequal-depth throttling plugs are disposed on the three air suspension working surfaces B, D, and H. Corresponding non-working surfaces A, C, and G are provided on the outside of B, D, and H respectively, and a plurality of air-sealing plugs are disposed on the two non-working surfaces A and C. A plurality of through transverse branch air passages are provided between the surfaces A and B as well as between the surfaces C and D, and the air-sealing plugs and the throttling plugs are disposed at exits on both sides of the transverse branch air passage. A plurality of through longitudinal branch air passages are provided between surfaces E and F, and end plugs are disposed at exits on both sides of the longitudinal branch air passage. A plurality of vertical branch air passages are provided perpendicular to the surface H, and the throttling plug is disposed at an exit on a single side of the vertical branch air passage. A vertical main air passage is provided perpendicular to each of surfaces M and N, and a sealing ring is disposed at an exit of the vertical main air passage. A transverse main air passage is provided perpendicular to the surface A, and an end plug is disposed at an exit of the transverse main air passage. A longitudinal main air passage is provided perpendicular to the surface E, and an end plug is disposed at an exit of the longitudinal main air passage. An air inlet passage is provided perpendicular to the surface C.

The air inlet passage is communicated with, and is perpendicular to, the longitudinal main air passage, the longitudinal main air passage is communicated with, and is perpendicular to, the vertical main air passage, the vertical main air passage is communicated with, and is perpendicular to, the transverse main air passage, the vertical main air passage and the transverse main air passage are communicated with, and are perpendicular to, the longitudinal branch air passage, and the longitudinal branch air passage is communicated with, and is perpendicular to, the transverse branch air passage and the vertical branch air passage. That is, a high-pressure gas enters from the air inlet passage, passes through the longitudinal main air passage, the vertical main air passage, the transverse main air passage, and the longitudinal branch air passage successively, and finally enters the air suspension working surfaces B, D, and H via the throttling plugs disposed on the vertical main air passage and the transverse main air passage.

The air-sealing screw connects the U-shaped air suspension bottom plate with the air suspension cover plate, the load unit is disposed on the air suspension cover plate, and the rail is disposed in a force sealed air suspension support and motion guiding structure formed by the U-shaped air suspension bottom plate and the air suspension cover plate. During working, the air-suspended rail is fixed by the rail base, and the U-shaped air suspension bottom plate, the air suspension cover plate and the load unit move along the air-suspended rail.

The plurality of unequal-depth throttling plugs are disposed on the three air suspension working surfaces B, D, and H, forming a plurality of unequal-depth chambers regularly distributed on the working surfaces B, D, and H.

The numbers of the longitudinal branch air passage, the transverse branch air passage and the vertical branch air passage change regularly with the area of the working surfaces B, D, and H, and the numbers of the air-sealing plug and the throttling plug change regularly with the numbers of the longitudinal branch air passage, the transverse branch air passage and the vertical branch air passage.

The material hardness of the throttling plug is greater than that of the U-shaped air suspension bottom plate and the air suspension cover plate. For example, the throttling plug adopts copper alloy CuZn20Al2, and the U-shaped air suspension bottom plate and the air suspension cover plate adopt anode aluminum alloy AlZnMgCu1.5.

The invention has the following characteristics and beneficial effects:

1. The U-shaped air suspension bottom plate in the device of the invention includes the air inlet passage, the vertical main air passage, the longitudinal main air passage, the transverse main air passage, the vertical branch air passage, the longitudinal branch air passage and the transverse branch air passage, all the air passages are staggered, and the high-pressure gas can be delivered to the three air suspension working surfaces B, D, and H via the throttling plugs, forming elastic gas films that do not interfere with each other, and supporting the air-suspended rail with high stability and guiding the air-suspended rail with high precision.

2. The U-shaped air suspension bottom plate and the air suspension cover plate in the device of the invention cooperate with each other to form the force sealed air suspension support and motion guiding structure, and the unequal-depth throttling chambers are regularly distributed on the working surfaces, so that secondary throttling of the high-pressure gas can be achieved, the pressure is favorably homogenized, and the stiffness of the gas films is favorably improved. When the U-shaped air suspension bottom plate and the air suspension cover plate rotate relative to the air-suspended rail, gas resistance matching is generated between the gas films and the corresponding unequal-depth throttling chambers, an unbalanced load supporting force is formed, and finally the purpose of enhancing the rotational stiffness is achieved.

The device of the invention is widely used, and is especially suitable for high-speed, high-frequency and high-precision motion occasions of a small cantilever mechanism in the exposure system of the lithography machine.

Figure 1:
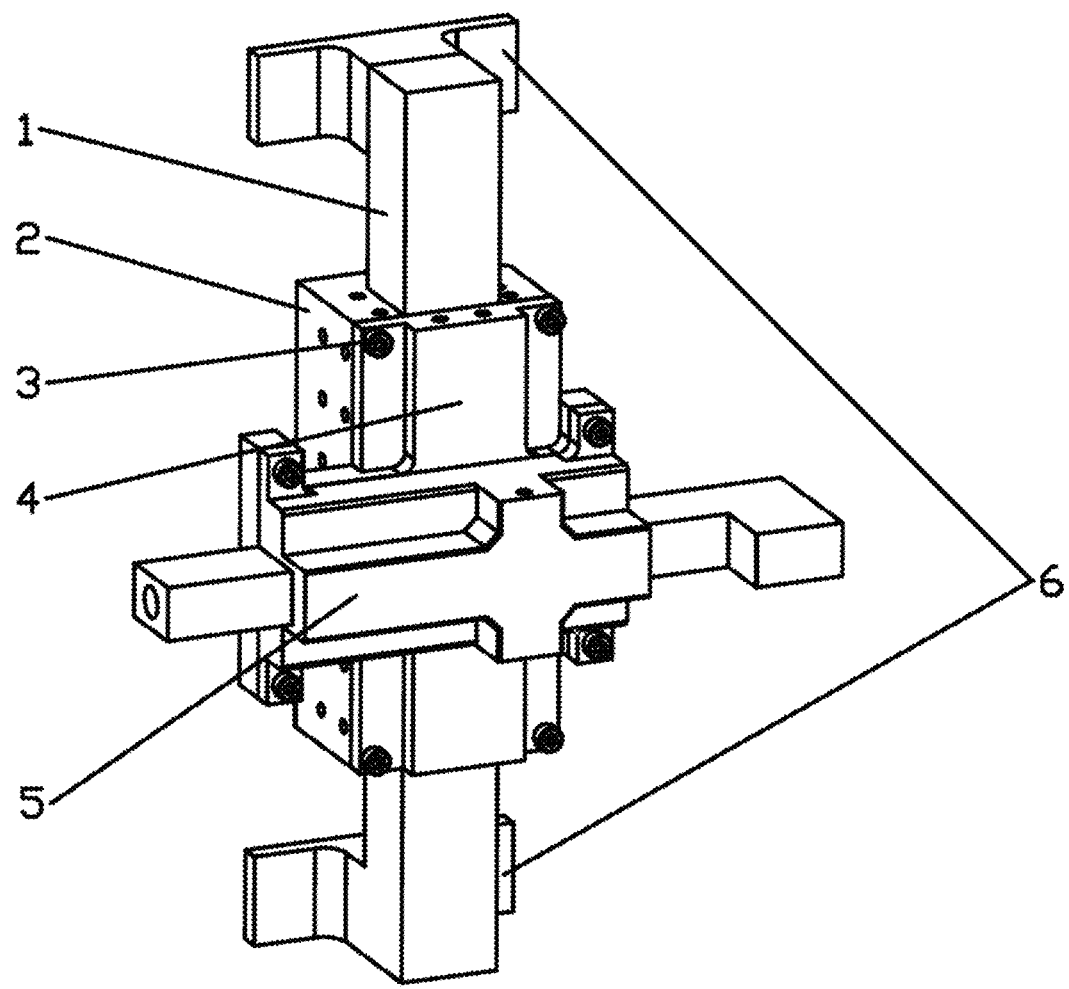
FIG. 1 is a schematic diagram of an air suspension support and motion guiding device having unequal-depth throttling chambers.
Figure 2:
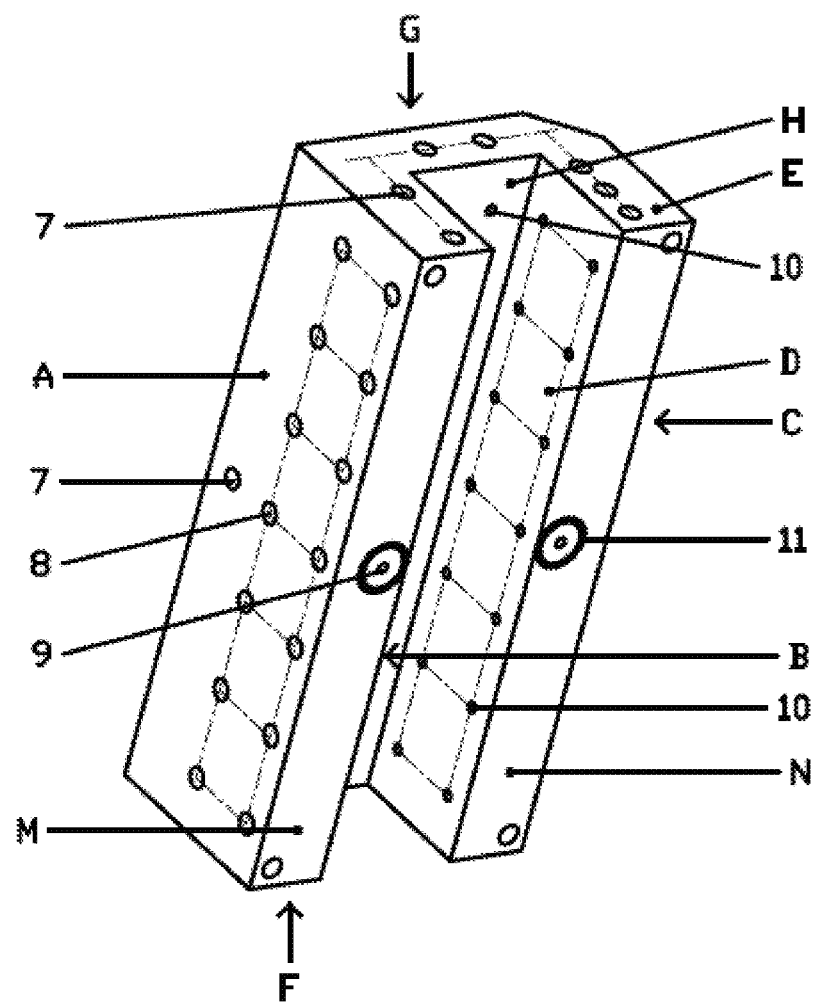
FIG. 2 is a schematic diagram of a U-shaped air suspension bottom plate.
Figure 3:
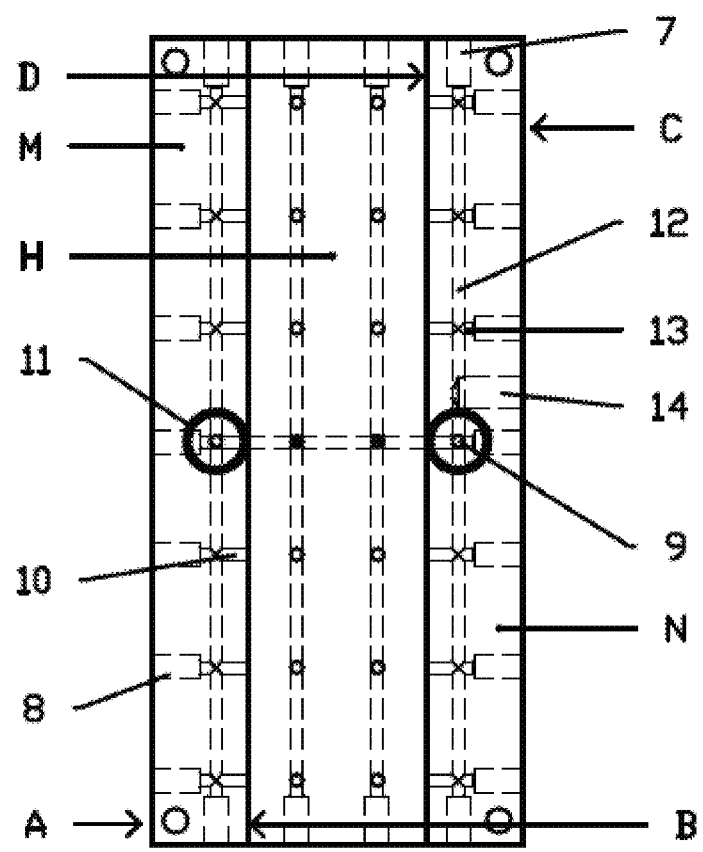
FIG. 3 is a front view of the U-shaped air suspension bottom plate.
Figure 4:
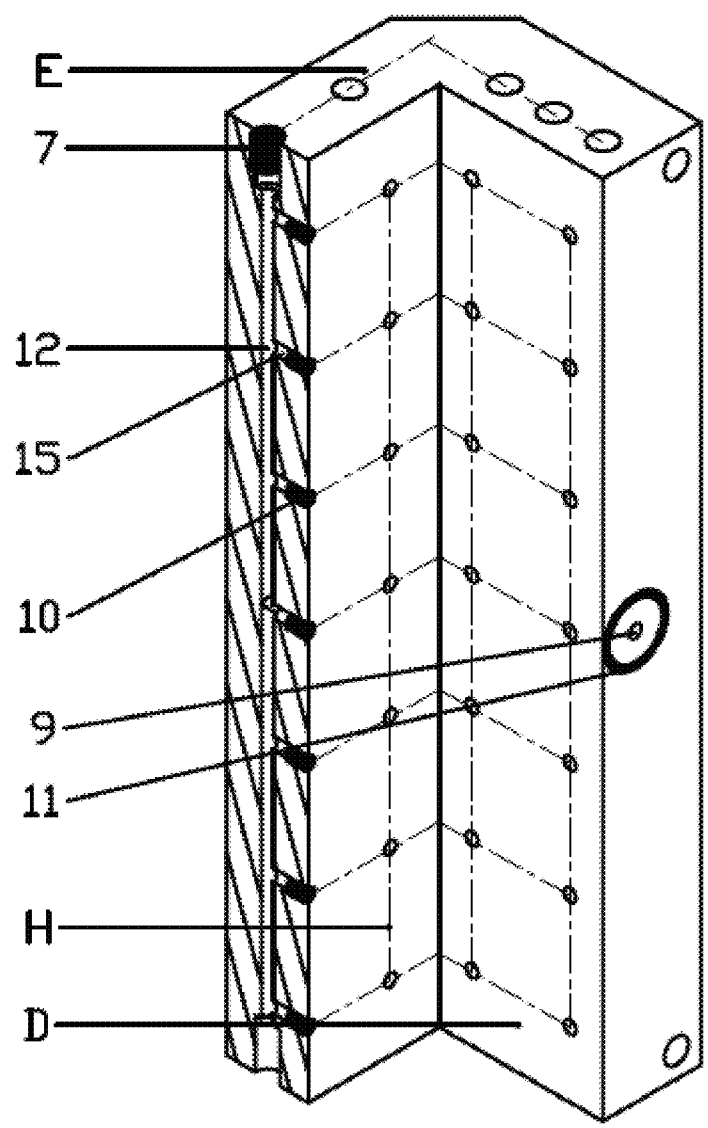
FIG. 4 is a cross-sectional view of a vertical branch air passage of the U-shaped air suspension bottom plate.
Figure 5:
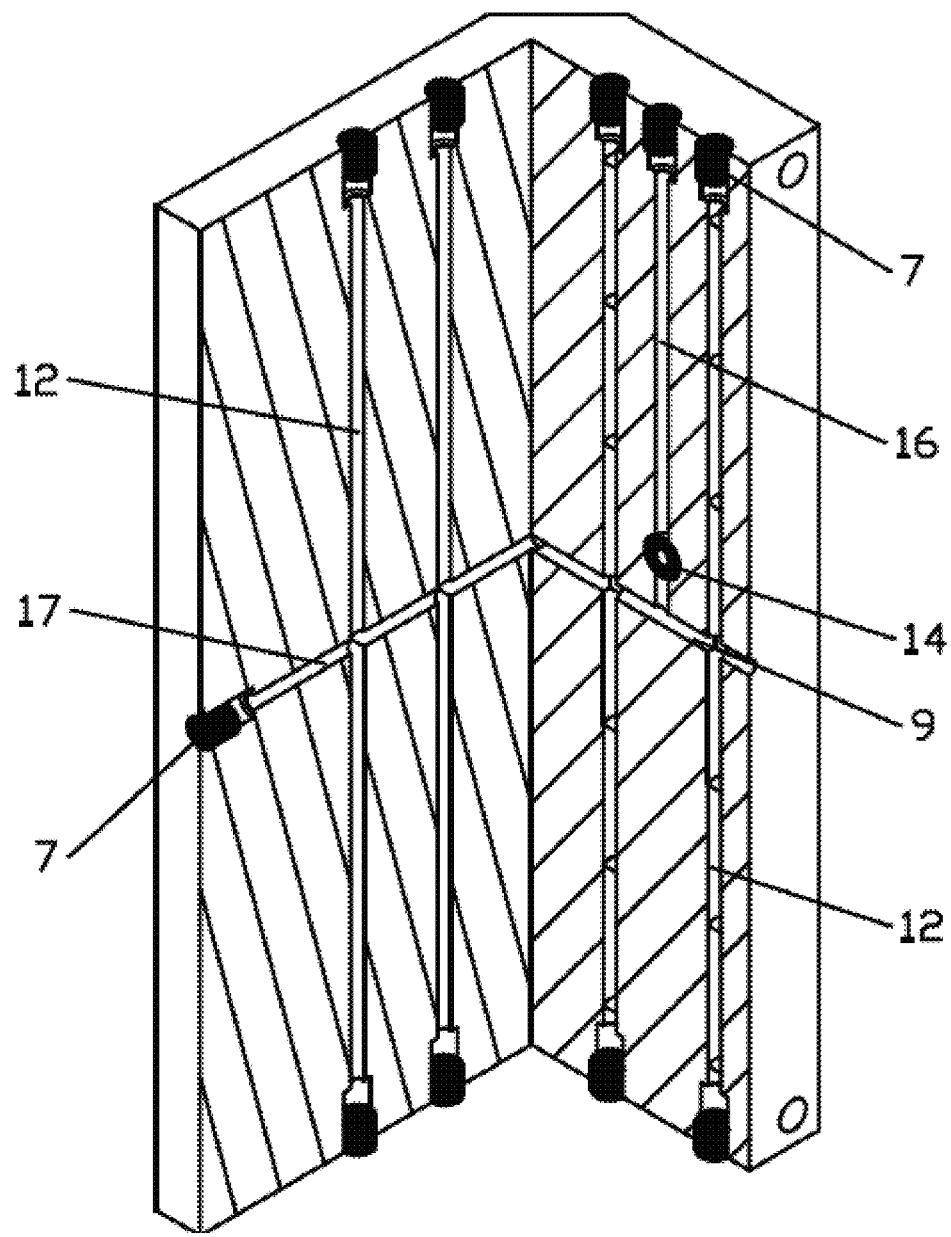
FIG. 5 is a cross-sectional view of a longitudinal branch air passage of the U-shaped air suspension bottom plate.

In the drawings, 1 denotes an air-suspended rail; 2 denotes a U-shaped air suspension bottom plate; 3 denotes an air-sealing screw; 4 denotes an air suspension cover plate; 5 denotes a load unit; 6 denotes a rail base; 7 denotes an end plug; 8 denotes an air-sealing plug; 9 denotes a vertical main air passage; 10 denotes a throttling plug; 11 denotes a seal ring; 12 denotes a longitudinal branch air passage; 13 denotes a transverse branch air passage; 14 denotes an air inlet passage; 15 denotes a vertical branch air passage; 16 denotes a longitudinal main air passage; and 17 denotes a transverse main air passage.

DETAILED DESCRIPTION

Embodiments of the invention are described in detail below with reference to the accompanying drawings.

Referring to FIG. 1, an air suspension support and motion guiding device having unequal-depth throttling chambers includes an air-suspended rail 1, a U-shaped air suspension bottom plate 2, an air-sealing screw 3, an air suspension cover plate 4, a load unit 5 and a rail base 6. The air-sealing screw 3 connects the U-shaped air suspension bottom plate 2 with the air suspension cover plate 4, the load unit 5 is disposed on the air suspension cover plate 4, and the rail 1 is disposed in a force sealed air suspension support and motion guiding structure formed by the U-shaped air suspension bottom plate 2 and the air suspension cover plate 4. During working, the air-suspended rail 1 is fixed by the rail base 6, and the U-shaped air suspension bottom plate 2, the air suspension cover plate 4 and the load unit 5 move along the air-suspended rail 1.

Referring to FIG. 2 to FIG. 5, three air suspension working surfaces B, D, and H are provided on the inside of the U-shaped air suspension bottom plate 2, and a plurality of unequal-depth throttling plugs 10 are disposed on the three air suspension working surfaces B, D, and H. Corresponding non-working surfaces A, C, and G are provided on the outside of B, D, and H respectively, and a plurality of air-sealing plugs 8 are disposed on the two non-working surfaces A and C. A plurality of through transverse branch air passages 13 are provided between the surfaces A and B as well as between the surfaces C and D, and the air-sealing plugs 8 and the throttling plugs 10 are disposed at exits on both sides of the transverse branch air passage 13. A plurality of through longitudinal branch air passages 12 are provided between surfaces E and F, and end plugs 7 are disposed at exits on both sides of the longitudinal branch air passage 12. A plurality of vertical branch air passages 15 are provided perpendicular to the surface H, and the throttling plug 10 is disposed at an exit on a single side of the vertical branch air passage 15. A vertical main air passage 9 is provided perpendicular to each of surfaces M and N, and a sealing ring 11 is disposed at an exit of the vertical main air passage 9. A transverse main air passage 17 is provided perpendicular to the surface A, and an end plug 7 is disposed at an exit of the transverse main air passage 17. A longitudinal main air passage 16 is provided perpendicular to the surface E, and an end plug 7 is disposed at an exit of the longitudinal main air passage 16. An air inlet passage 14 is provided perpendicular to the surface C.

The air inlet passage 14 is communicated with, and is perpendicular to, the longitudinal main air passage 16, the longitudinal main air passage 16 is communicated with, and is perpendicular to, the vertical main air passage 9, the vertical main air passage 9 is communicated with, and is perpendicular to, the transverse main air passage 17, the vertical main air passage 9 and the transverse main air passage 17 are communicated with, and are perpendicular to, the longitudinal branch air passage 12, and the longitudinal branch air passage 12 is communicated with, and is perpendicular to, the transverse branch air passage 13 and the vertical branch air passage 15. That is, a high-pressure gas enters from the air inlet passage 14, passes through the longitudinal main air passage 16, the vertical main air passage 9, the transverse main air passage 17, and the longitudinal branch air passage 12 successively, and finally enters the air suspension working surfaces B, D, and H via the throttling plugs 10 disposed on the vertical main air passage 9 and the transverse main air passage 17.

The plurality of unequal-depth throttling plugs 10 are disposed on the three air suspension working surfaces B, D, and H, forming a plurality of unequal-depth chambers regularly distributed on the working surfaces B, D, and H.

The numbers of the longitudinal branch air passage 12, the transverse branch air passage 13 and the vertical branch air passage 15 change regularly with the area of the working surface B, D, and H, and the numbers of the air-sealing plug 8 and the throttling plug 10 change regularly with the numbers of the longitudinal branch air passage 12, the transverse branch air passage 13 and the vertical branch air passage 15.

The material hardness of the throttling plug 10 is greater than that of the U-shaped air suspension bottom plate 2 and the air suspension cover plate 4. For example, the throttling plug 10 adopts copper alloy CuZn20Al2, and the U-shaped air suspension bottom plate 2 and the air suspension cover plate 4 adopt anode aluminum alloy AlZnMgCu1.5.

What is claimed is:

1. An air suspension, comprising an air-suspended rail, a U-shaped air suspension bottom plate, and an air suspension cover plate;

wherein the U-shaped air suspension bottom plate comprises a first inner surface (B), a second inner surface (H), a third inner surface (D), a first outer surface (A), a second outer surface (G), a third outer surface (C), a first end surface (E), a second end surface (F), a fourth outer surface (M) and a fifth outer surface (N);

wherein the first inner surface (B), the second inner surface (H), the third inner surface (D), the first outer surface (A), the second outer surface (G), the third outer surface (C), the fourth outer surface (M) and the fifth outer surface (N) extend between and join the first end surface (E) and the second end surface (F);

wherein the second inner surface (H) extends between the first inner surface (B) and the third inner surface (D), the second outer surface (G) extends between the first outer surface (A) and the third outer surface (C), the fourth outer surface (M) extends between the first outer surface (A) and the first inner surface (B), the fifth outer surface (N) extends between the third outer surface (C) and the third inner surface (D);

wherein the air suspension further comprises:

a plurality of through transverse branch air passages extending between the first outer surface (A) and the first inner surface (B) as well as between the third outer surface (C) and the third inner surface (D), a plurality of through longitudinal branch air passages extending between the first end surface (E) and the second end surface (F), wherein some of the through longitudinal branch air passages are sandwiched between the first outer surface (A) and the first inner surface (B), some of the through longitudinal branch air passages are sandwiched between the second outer surface (G) and the second inner surface (H), and some of the through longitudinal branch air passages are sandwiched between the third outer surface (C) and the third inner surface (D), end plugs in the through longitudinal branch air passages at the first end surface (E) and the second end surface (F), a plurality of vertical branch air passages extending from the second inner surface (H) to the through longitudinal branch air passages sandwiched between the second outer surface (G) and the second inner surface (H), a first plurality of throttling plugs in the vertical branch air passages at the second inner surface (H), a vertical main air passage sandwiched between the third outer surface (C) and the third inner surface (D), the vertical main air passage connected to the through longitudinal branch air passages sandwiched between the third outer surface (C) and the third inner surface (D), a transverse main air passage sandwiched between the second outer surface (G) and the second inner surface (H) and connected to the vertical main air passage, a longitudinal main air passage sandwiched between the third outer surface (C) and the third inner surface (D), the longitudinal main air passage connected to and perpendicular to the vertical main air passage, an air inlet passage opened at the third outer surface (C) and connected to the longitudinal main air passage, a second plurality of throttling plugs in the through transverse branch air passages, at the first inner surface (B) and the third inner surface (D), a plurality of air-sealing plugs on the first outer surface (A) and the third outer surface (C), the air-sealing plugs configured to block air passage therethrough and are in the through transverse branch air passages on the first outer surface (A) and the third outer surface (C);

wherein the first plurality of throttling plugs and the second plurality of throttling plugs are configured to throttle air passage therethrough;

wherein the vertical main air passage and the transverse main air passage are connected to the through longitudinal branch air passages, and the through longitudinal branch air passages sandwiched between the first outer surface (A) and the first inner surface (B) and sandwiched between the third outer surface (C) and the third inner surface (D) are connected to the through transverse branch air passages; and wherein the U-shaped air suspension bottom plate is secured to the air suspension cover plate, and the air-suspended rail is embraced by and slidable relative to the U-shaped air suspension bottom plate and the air suspension cover plate.

2. The air suspension according to claim 1, wherein the throttling plugs have a greater hardness than the U-shaped air suspension bottom plate and the air suspension cover plate.

* * * * *